June 15, 1937. F. E. KEY 2,084,146
STUD BOLT
Filed June 1, 1936
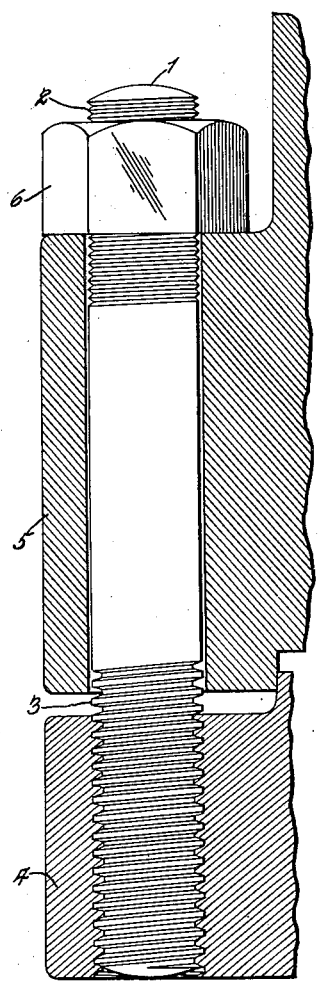
Inventor
Frederick E. Key
by Rippey & Cassidy
His Attorneys.

Patented June 15, 1937

2,084,146

UNITED STATES PATENT OFFICE 2,084,146

STUD BOLT

Frederick E. Key, St. Louis, Mo., assignor to Key Company, East St. Louis, Ill., a corporation of Missouri Application June 1, 1936, Serial No. 82,782

1 Claim. (Cl. 85—1)

This invention relates to stud bolts.

In the use of bolts for holding machine elements where high pressures and temperatures are encountered, such as in fittings for petroleum cracking stills, difficulties have arisen by nuts freezing on the bolts. This has necessitated cutting the bolts in two in order to disassemble the parts, resulting in the complete loss of the bolts. The expense is enhanced by the fact that such bolts are often made of expensive alloy steels. An object of this invention is to produce a stud bolt to be used in assembly with machine parts which will permit the bolt to be withdrawn even though its nut is frozen tight. After the bolt is withdrawn it may then be sent to a machine shop where the nut can be removed by application of heat or cutting from the bolt. This object and the means by which it is accomplished will be apparent from the following detail description taken in connection with the accompanying drawing.

The drawing shows a stud bolt embodying this invention in combination with two machine parts or elements and illustrates the environment in which the bolt is used.

A bolt 1 has relatively fine threads 2 of relatively low pitch on its outer end and relatively coarse threads 3 of relatively high pitch on its inner end. For threads on the outer end S. A. E. standard fine threads have been found satisfactory and for threads on the inner end Acme threads have been found satisfactory.

The inner end of the bolt engages in a threaded socket in a machine element 4, while a machine element 5 has a collar which is about the bolt and is adapted to be engaged by a nut 6 threaded on the fine threads to clamp the parts 4 and 5 in assembly. Such an arrangement is disclosed in my application Serial No. 69,799, filed May 20, 1936, for Return bend, for use in oil stills which are subject to high temperatures and high pressures.

The low pitch on the outer end is sufficient to enable the nut 6 to be tightened properly, whereas the high pitch coarse threads in the lower end enable the bolt to be withdrawn readily. As stated in the introductory part of this description, in certain environments where high temperatures and pressures are encountered, nuts usually become frozen on the bolts due to the temperatures and to the fact that low pitch is required in order to properly tighten and hold the parts in assembly. Heretofore it has been necessary to cut the bolt in order to disassemble the parts. This has caused a substantial loss, especially since high priced alloys may be used in the bolts. But with this invention, even if the nut is frozen to the bolt, the bolt may be withdrawn and taken to a machine shop for salvage without loss other than the loss of the nut and repair of the threads.

It will be apparent, therefore, that the invention accomplishes its objects. A bolt has been provided for assembling machine parts together where the threads are such that the nut may be properly tightened, but so arranged that the bolt may be withdrawn readily and thus avoid its destruction.

I claim:

A stud bolt having relatively coarse threads of high pitch on one end and relatively fine threads of low pitch on the other end, in combination with a machine element having a socket internally threaded to receive the high pitch threads of the bolt, a second machine element about the bolt, and a nut threaded on the other end and engaging said second machine element to clamp and hold said machine elements together, whereby the threads of low pitch afford means for exerting high pressure by the nut when tightened in clamping relationship and the threads of high pitch permit easy removal of the bolt.

FREDERICK E. KEY.